US012786546B2

(12) United States Patent
Hall

(10) Patent No.: US 12,786,546 B2
(45) Date of Patent: *Nov. 3, 2026

(54) VERTEX CHANGE DETECTION FOR ENHANCED DOCUMENT CAPTURE

(71) Applicant: INTUIT INC., Mountain View, CA (US)

(72) Inventor: Jason Hall, Honolulu, HI (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,997

(22) Filed: Jan. 11, 2024

(65) Prior Publication Data

US 2024/0147047 A1 May 2, 2024

Related U.S. Application Data

(63) Continuation of application No. 17/391,179, filed on Aug. 2, 2021, now Pat. No. 11,910,079.

(51) Int. Cl.
*H04N 23/61* (2023.01)
*G06F 18/22* (2023.01)
(Continued)

(52) U.S. Cl.
CPC ............. *H04N 23/61* (2023.01); *G06F 18/22* (2023.01); *G06F 18/251* (2023.01);
(Continued)

(58) Field of Classification Search
CPC .... H04N 23/61; H04N 23/68; H04N 23/6812; H04N 23/6811; G06F 18/22;
(Continued)

(56) References Cited

U.S. PATENT DOCUMENTS

2019/0174068 A1* 6/2019 Wang .................. H04N 23/611
2020/0205942 A1* 7/2020 Pesach ................ A61B 5/0088
2021/0160419 A1* 5/2021 Yao ..................... H04N 19/182

FOREIGN PATENT DOCUMENTS

CN 111563895 A * 8/2020 ........... H04N 23/951
JP 2006174105 A * 6/2006

OTHER PUBLICATIONS

"Thuy Tuong Nguyen et. al., Camera auto-exposing and auto-focusing for edge-related applications using a particle filter, Oct. 2010, 2010 IEEE.RSJ International Conference on Intelligent Robots and Systems, Taipei, Taiwan" (Year: 2010).*

(Continued)

*Primary Examiner* — Chineyere Wills-Burns
*Assistant Examiner* — Phuong Hau Cai
(74) *Attorney, Agent, or Firm* — Patterson + Sheridan, LLP

(57) ABSTRACT

Aspects of the present disclosure relate to object-based image capture. Embodiments include identifying a reference point corresponding to an object in an image of a series of images. Embodiments include comparing a position of the reference point in the image to positions of one or more corresponding reference points in one or more previous images in the series of images. Embodiments include determining a total number of images in the series of images. Embodiments include selecting, based on the comparing and the total number of images in the series of images, between capturing the image or declining to capture the image.

20 Claims, 5 Drawing Sheets

(51) Int. Cl.
*G06F 18/25* (2023.01)
*G06T 7/00* (2017.01)
*G06T 7/246* (2017.01)
*G06V 30/182* (2022.01)
*G06V 30/24* (2022.01)

(52) U.S. Cl.
CPC ............ *G06T 7/0002* (2013.01); *G06T 7/248* (2017.01); *G06V 30/182* (2022.01); *G06V 30/248* (2022.01); *G06T 2207/10016* (2013.01); *G06T 2207/30176* (2013.01)

(58) Field of Classification Search
CPC ..... G06F 18/251; G06T 7/0002; G06T 7/248; G06T 2207/10016; G06T 2207/30176; G06V 30/182; G06V 30/248; G06V 10/761; G06V 30/412
See application file for complete search history.

(56) References Cited

OTHER PUBLICATIONS

"Alina E. Marcu et. al., Flicker Free Visible Light Communication Using Low Frame Rate Camera, Nov. 2018, 2018 International Sumposium on Fundamentals of Electrical Engineering, Bucharest, Romania" (Year: 2018).*
"Francois Chaumette,, Potential Problems of Stability and Convergence in Image-Based and Position-Based Visual Servoing, Jan. 2017, Part of the Lecture Notes in Control and Information Sciences book series LBCIS, vol. 237, The Confluence of Vision and Control, pp. 66-78" (Year: 2017).

* cited by examiner

VERTEX CHANGE DETECTION FOR ENHANCED DOCUMENT CAPTURE

CROSS-REFERENCE TO RELATED APPLICATIONS

This application is a continuation of U.S. patent application Ser. No. 17/391,179, entitled "Vertex Change Detection for Enhanced Document Capture," filed Aug. 2, 2021, the contents of which are hereby incorporated by reference in their entirety.

INTRODUCTION

Aspects of the present disclosure relate to improved techniques for detecting and capturing objects, such as documents, in images. In particular, techniques described herein involve comparing vertex positions in successive image frames to determine whether to capture an image.

BACKGROUND

Every year, millions of people, businesses, and organizations around the world utilize software applications to assist with countless aspects of life. For example, applications often allow users to capture an image of an object, such as a document, to extract information from the object, provide the image to a third party, and/or to otherwise utilize the image for some useful end. However, capturing an object clearly in an image can be challenging for a variety of reasons.

For example, a device used to capture the image must be held in a stable position for a sufficient length of time and with the object properly framed within the camera's field of view for the object to be clearly captured within the image. In some cases, the clarity of the image may be subject to specific requirements, such as if the image will be used to extract data from the object or if the image will be sent to a third party (e.g., to verify contents of a check deposited through a mobile application). In some cases, the stability of the object within the camera's field of view may be difficult to detect with the naked eye.

The process of detecting an object in an image is likewise challenging, such as when the image of the object is blurry or the object is not properly framed in the image. Existing techniques for object capture generally involve capturing an image immediately after detecting the object owing, for example, to the tendency of a handheld camera to move sporadically during the capturing process. However, this tendency as well as movement by the object and/or other environmental elements often result in blurry, out-of-focus, and/or otherwise inadequate images of the object.

Accordingly, there is a need in the art for improved techniques of capturing an image of an object that ensure the object is captured clearly and accurately in the image.

BRIEF SUMMARY

Certain embodiments provide a method for object-based image capture. The method generally includes: identifying a reference point corresponding to an object in an image of a series of images; comparing a position of the reference point in the image to positions of one or more corresponding reference points in one or more previous images in the series of images; determining a total number of images in the series of images; and selecting, based on the comparing and the total number of images in the series of images, between: capturing the image; or declining to capture the image.

Other embodiments provide a method for object-based image capture. The method generally includes: receiving a series of images captured consecutively from a camera associated with a device; identifying a reference point corresponding to an object in a last image in the series of images; determining an acceptable position range with respect to the reference point based on a position of the reference point in the image and a threshold distance; determining that one or more corresponding reference points are within the acceptable position range in one or more previous images in the series of images; determining not to remove the one or more previous images from the series of images based on the determining that the one or more corresponding reference points are within the acceptable position range in the one or more previous images in the series of images; determining that a total number of images in the series of images exceeds a threshold; and capturing the last image based on the determining that the one or more corresponding reference points are within the acceptable position range in the one or more previous images in the series of images and the determining that the total number of images in the series of images exceeds the threshold.

Other embodiments provide a system comprising one or more processors and a non-transitory computer-readable medium comprising instructions that, when executed by the one or more processors, cause the system to perform a method. The method generally includes: identifying a reference point corresponding to an object in an image of a series of images; comparing a position of the reference point in the image to positions of one or more corresponding reference points in one or more previous images in the series of images; determining a total number of images in the series of images; and selecting, based on the comparing and the total number of images in the series of images, between: capturing the image; or declining to capture the image.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
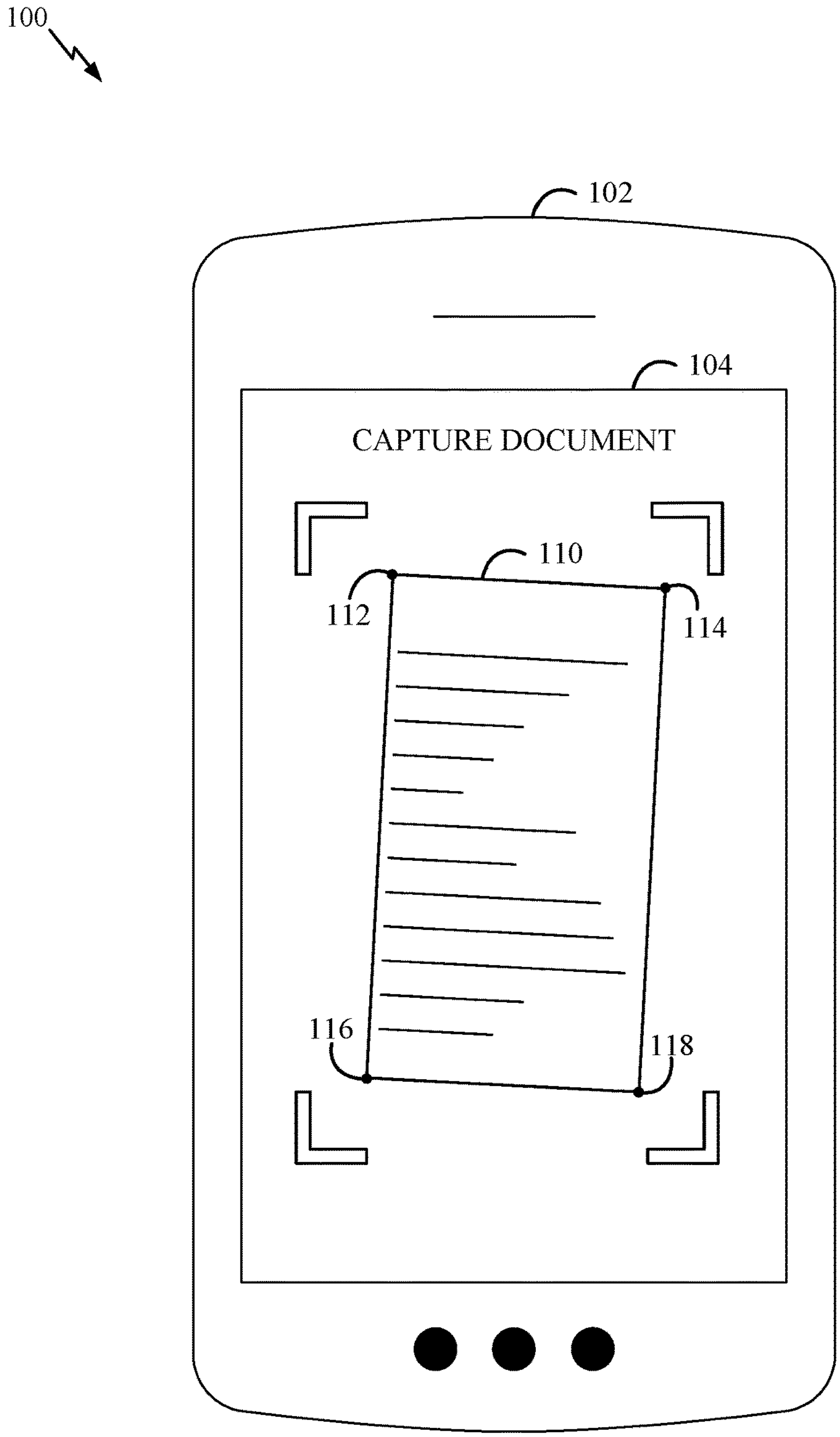
FIG. 1 depicts an example related to object-based image capture.

Aspects of the present disclosure provide apparatuses, methods, processing systems, and computer-readable mediums for capturing an image of an object.

A software application may call for the capture of images of objects, such as using a camera associated with a device (e.g., mobile phone) to capture a picture of a paper check for deposit. As another example, a user may capture an image of a document so that text can be extracted from the document. In yet another example, a user may capture an image of a document so that it can be provided to a third party, such as a bank or a counterparty to a transaction, to verify contents of the document. In a further example, a user may capture an image of a damaged vehicle so that the image can be provided to an insurance company as a record of damage related to an insurance claim. Many other examples are possible. However, even if an object is successfully detected in a camera's field of view, the image may still be blurry, out-of-focus, and/or otherwise inadequate for its intended purpose, such as due to ongoing motion of the camera, the object, and/or other elements in the environment. As such, techniques described herein involve determining whether one or more reference points related to an object remain within an acceptable position range in a series of images prior to capturing an image of the object. Thus, embodiments of the present disclosure ensure that the camera and object are stable for an amount of time prior to capturing an image of the object. The captured image is therefore more likely to be clear, and the object in the image is more likely to be in-focus and identifiable.

In certain embodiments, a list of recent image frames is maintained. An image frame generally refers to a single image in a consecutive series of images captured using an image sensor, such as a camera. For example, a consecutive series of images may be captured using a camera, and the consecutive series of images may be stored in the list of recent image frames. In various aspects, a set number of images may be captured.

In one example, an object detection technique is used to detect the presence of an object in the series of images. In some examples, a detection technique may be based on detecting groups of pixels that correspond to objects in images. Embodiments described herein are compatible with many object detection techniques, and especially any technique that allows for identifying at least one reference point (e.g., corner or other vertex) of an object in an image.

According to certain embodiments, at least one reference point of an object is detected in the current (e.g., most recent) image in the list of recent image frames. The reference point may be, for example, a corner of a document, a center point of an object, an identifiable feature such as certain text or a certain image in a document, a feature of a person, and/or the like. For example, coordinates (e.g., X and Y coordinates relative to an origin reference, such as the bottom left corner of the image) of the reference point in the current image may be determined. The reference point is then identified in each previous image in the list of recent image frames in order to determine whether a position of the reference point has deviated substantially from its positions in the previous images. In one example, the position of the reference point in each of the previous images is compared to the position of the reference point in the current image, and if any of the previous positions of the reference point is more than a threshold distance from the position of the reference point in the current image then the reference point is determined to have substantially deviated. If the reference point has substantially deviated, the list of recent image frames may be cleared, and a new list may be started (e.g., which may include the current image as a first image in the list).

Once the reference point remains within an acceptable position range (e.g., not substantially deviating) for a given number of image frames, an image of the object may be captured. In one example, the image of the object is not captured until the reference point remains within an acceptable position range for a consecutive series of six image frames, however, other numbers of frames may be used. Thus, by waiting to capture an image of an object until a reference point of the object remains stable for a given number of image frames, techniques described herein ensure that the camera and the object are stable when the image is captured.

Furthermore, in some embodiments, an accelerometer associated with the device used to capture the image may be used to determine whether the device is stable. For example, data from the accelerometer may be received on an ongoing basis and, if the data indicates an acceleration value exceeding a threshold (e.g., a surge of acceleration), then the list of recent image frames may be cleared, and an image may not be captured until data from the accelerometer indicates that the device is stable. This is because a surge of acceleration likely indicates that the device has moved substantially, and that the previous image frames may no longer be relied upon as representing the device's current position.

Embodiments of the present disclosure provide multiple improvements over conventional techniques for capturing images of objects. For example, by tracking the position of one or more reference points of an object in a series of image frames and waiting to capture an image of the object until the reference point remains within an acceptable position range for a given number of image frames, embodiments of the present disclosure ensure that the camera and the object are stable before the image is captured. As such, techniques described herein overcome the shortcomings of conventional techniques, such as those that capture an image immediately after an object is detected, by preventing the capture of blurry, out-of-focus, and/or otherwise inadequate images of objects. Further, by further considering data from an accelerometer to determine whether a device is stable prior to capturing an image, in some embodiments, techniques described herein further ensure that images captured are stable and clear and that the series of images relied upon to determine stability are reflective of the current position of the device at the time the image is captured. As such, by ensuring stability and clarity, images captured using techniques described herein can be more effectively used for a variety of purposes, such as extracting text from images, classifying objects in images, providing images to third parties, and the like.

Example of Object-Based Image Detection

FIG. 1 depicts an example 100 of object-based image capture. In particular, example 100 includes a device 102, which may be representative of a mobile device such as a smartphone. Generally, techniques described herein may also be utilized with other types of devices including image sensors. Furthermore, while some embodiments involve performing techniques described herein solely on one device, other embodiments may involve performing aspects of the present disclosure on separate devices.

In the depicted example, device 102 includes a screen 104 through which a user views a user interface associated with a software application. In one example, the software application involves image capture functionality, such as allowing the user to capture an image of a document. In illustration 100, image capture functionality of the application has been activated, and a camera associated with device 102 is used to capture an image.

A document 110 is present within the field of view of the camera associated with device 102. For example, the document 110 may be resting on a surface directly in front of device 102, and device 102 may be held in the user's hand. The presence of document 110 may be detected in images captured using the camera according to various detection techniques. In certain embodiments, a consecutive series of image frames, including document 110, is captured and stored in a list of recent image frames.

Shown within screen 104 is a current (e.g., most recent) image captured using the camera. The image includes document 110. Reference points 112, 114, 116, and 118, corresponding to the four corners of document 110, are detected in the image. According to techniques described herein, positions (e.g., coordinates) of reference points 112, 114, 116, and 118 are compared to corresponding positions of these reference points in the previous images included in the list of recent image frames. For example, as described in more detail below with respect to FIGS. 2 and 3, a distance may be determined between the position of each reference point 112, 114, 116, and 118 in the current image and the corresponding positions of that reference points in each previous image in the list of recent image frames to determine whether any of the distances exceed a threshold. If any of the distances exceeds the threshold, the corresponding reference point may be determined to have substantially deviated and, based on this determination, the application may decline to capture an image, and the list of recent image frames may be cleared. However, if none of the distances exceed the threshold and a total number of image frames in the list of recent image frames exceeds a threshold (e.g., if all of reference points 112, 114, 116, and 118 have remained within an acceptable position range for a given number of image frames), then an image of document 110 may be captured. For example, the current image may be captured as the image of document 110.

In some embodiments, an accelerometer associated with device 102 is utilized to determine stability of device 102. For example, the application may receive data from the accelerometer on an ongoing basis and, if the data indicates an amount of acceleration that exceeds a threshold, the application may detect an acceleration surge. In the event of an acceleration surge, an image may not be captured until data from the accelerometer indicates that the device is stable. Furthermore, in some embodiments, the list of recent image frames is cleared when an acceleration surge is detected, as the acceleration surge indicates that the device is no longer stable and that the list of recent image frames can no longer be relied upon.

Thus, according to certain embodiments, an image of document 110 is only captured by device 102 if reference points 112, 114, 116, and 118 remain within an acceptable position range for a given number of image frames and, in some embodiments, if data from the accelerometer does not indicate an acceleration surge during the time in which the given number of image frames are captured. It is noted that the use of an accelerometer is optional, and techniques described herein can be performed without the use of acceleration data from an accelerometer. In alternative embodiments, fewer or more reference points may be utilized. For example, if the object is a person, reference points corresponding to the person's eyes and/or one or more other features may be utilized. In another example, ia center point of the object may be used as a reference point. In a further example, a feature of a document (e.g., specific text, images, or formatting) may be used as a reference point. When multiple reference points are utilized, certain techniques involve waiting to capture an image until all of the reference points remain within an acceptable position range for a given number of image frames.

According to some embodiments, notifications may be provided (e.g., within screen 104 of device 102) based on determined stability. For example, if a position of a reference point of an object in a current image is determined to have substantially deviated from its position in one or more previous images and/or if an acceleration value beyond a threshold is determined, then a notification may be presented to the user. For example, a notification may inform a user of the detected instability and/or direct the user to take action to correct the issue (e.g., to attempt to hold the device in a more stable position). In one example, a notification is displayed within screen 104 of device 102 stating that motion has been detected and that the user should attempt to hold the device steady in order to capture a clear image.

Once captured using techniques described herein, an image may be used to extract text, verify information, classify objects, serve as records of transactions or events, and for a variety of other purposes.

Example Image Frames for Object-Based Image Capture

Figure 2:
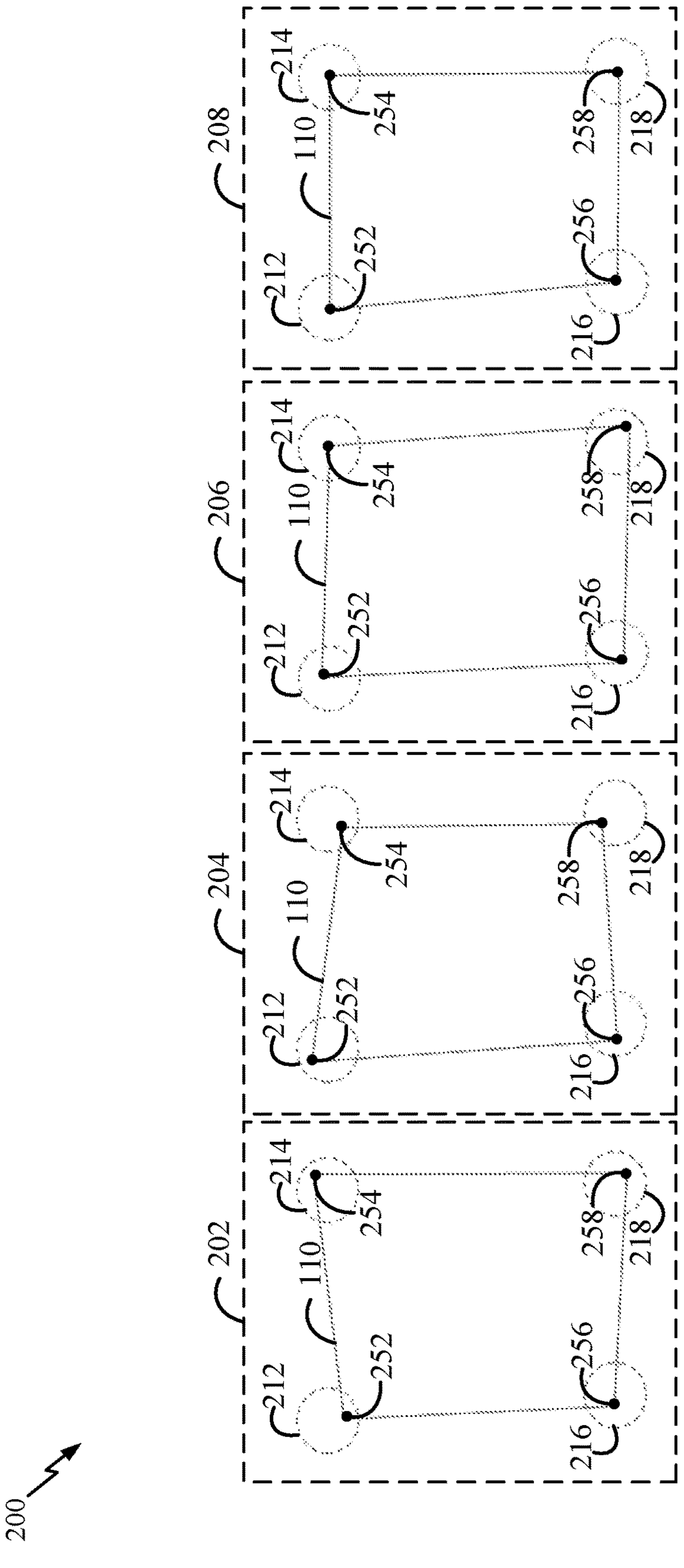
FIG. 2 depicts example image frames related to object-based image capture.

FIG. 2 is an illustration 200 of example image frames related to object-based image capture. For example, the image frames depicted in illustration 200 may be captured by device 102 of FIG. 1.

A series of image frames 202, 204, 206, and 208 are captured consecutively. For example, once document 110 is detected in image frame 202, an application may begin to capture the series of images starting with image frame 202 and ending with image frame 208 (e.g., which may be a set number of image frames). Image frames 202, 204, 206, and 208 may be stored in a list of recent image frames. Some embodiments involve capturing the image frames immediately after one another, while other embodiments involve capturing the image frames at set time intervals. For example, for a camera with a high frame rate, capturing a small number of consecutive image frames, such as six image frames, immediately after one another may represent only a fraction of a second. As such, it may be preferable in such cases to space the image frames at intervals (e.g., quarter-second intervals) in order to evaluate reference points over a longer period of time without requiring analysis of a large number of image frames.

Reference points 252, 254, 256, and 258 are detected in the current image frame 208, and correspond to the four corners of document 110. Ranges 212, 214, 216, and 218 indicate acceptable position ranges with respect to each of reference points 252, 254, 256, and 258. For instance, each of ranges 212, 214, 216, and 218 may comprise a circular region with a radius corresponding to a threshold distance and a center point corresponding to one of reference points 252, 254, 256, and 258.

Ranges 212, 214, 216 and 218 are then used to determine whether the corresponding reference points in each of previous image frames 202, 204, and 206 are within an acceptable range of reference points 252, 254, 256, and 258 in the current image frame 208.

In illustration 200, the four corners of document 110 (reference points 252, 254, 256, and 258) are within ranges 212, 214, 216, and 218 in each of image frames 202, 204, 206, and 208. As such, image frame 208 may be captured as an image of document 110 (e.g., if the total number of image frames 202, 204, 206, and 208 reaches a threshold and, in some embodiments, if data from an accelerometer has not indicated an acceleration surge). For example, if the threshold number of image frames for which reference points must remain within an acceptable position range is set to 4, then image frame 208 may be captured. However, as explained in more detail below with respect to FIG. 3, any deviation from ranges 212, 214, 216, or 218 (and, in some embodiments, any detected acceleration surge) may cause the image not to be captured and the list of recent image frames to be cleared.

Figure 3:
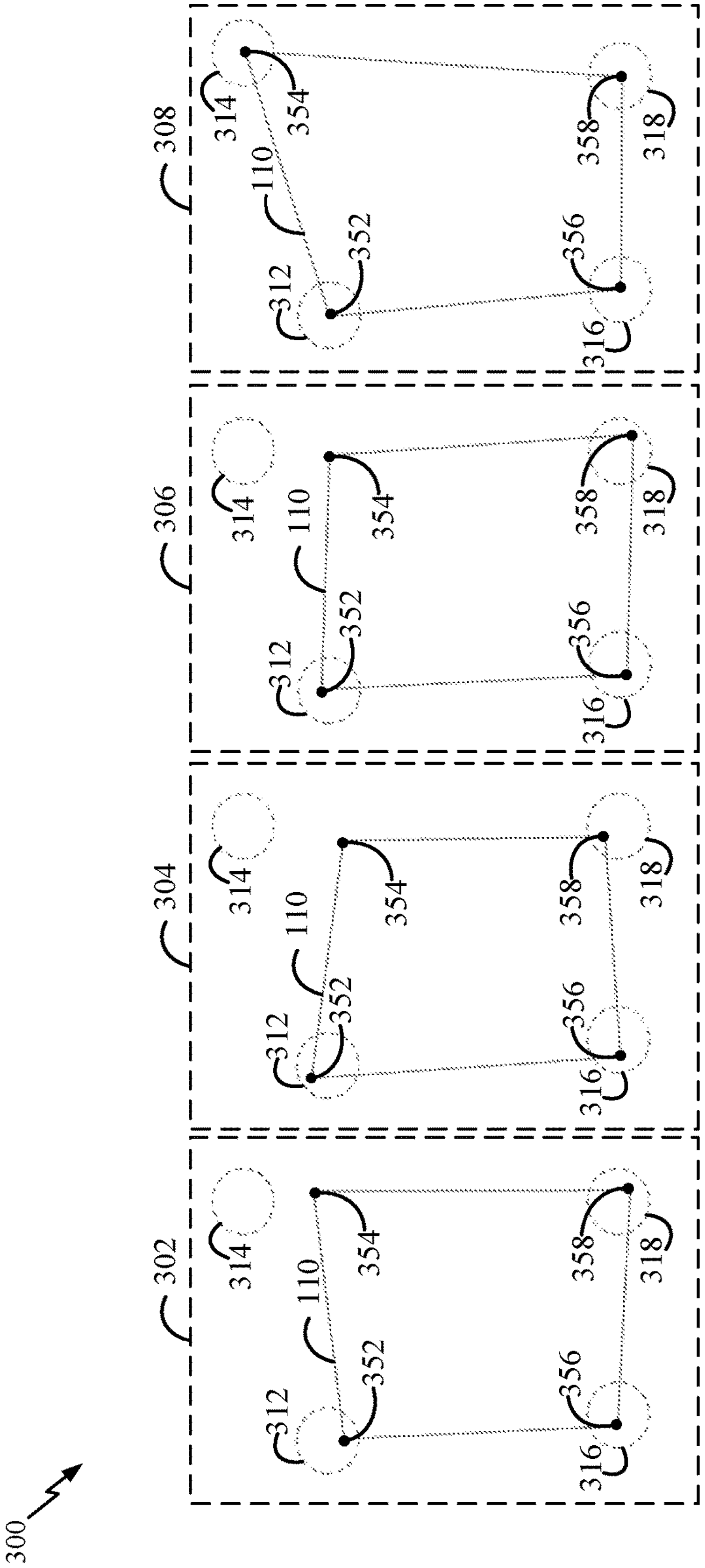
FIG. 3 depicts additional example image frames related to object-based image capture.

FIG. 3 depicts an example 300 of additional example image frames related to object-based image capture. For example, the image frames depicted in illustration 300 may be captured by device 102 of FIG. 1.

A series of image frames 302, 304, 306, and 308 are captured consecutively (e.g., immediately after one another or at set time intervals). For example, once document 110 is detected in image frame 302, an application may begin to capture the series of images starting with image frame 302 and ending with image frame 308. Image frames 302, 304, 306, and 308 may be stored in a list of recent image frames.

Reference points 352, 354, 356, and 358 are detected in the current image frame 308, and correspond to the four corners of document 110. Ranges 312, 314, 316, and 318 indicate acceptable position ranges with respect to each of reference points 352, 354, 356, and 358.

Ranges 312, 314, 316 and 318 are used to determine whether the corresponding reference points in each of previous image frames 302, 304, and 306 are within an acceptable range of reference points 352, 354, 356, and 358 in the current image frame 308.

In illustration 300, the reference point 354 corresponding to the top right corner of document 110 is not within range 314 in any of image frames 302, 304, and 306. As such, even though the other three corners of document 110 (reference points 352, 356, and 358) are within their corresponding ranges 312, 316, and 318 in image frames 302, 304, 306, reference point 354 may be considered to be substantially deviated. As such, because reference point 354 in image frame 308 has substantially deviated from corresponding reference points in previous image frames 302, 304, and 306, the application may decline to capture the image, and the list of recent image frames may be cleared. In some embodiments, image frame 308 is used as the first image frame in a new list of recent image frames, and a subsequent series of image frames is captured and added to the new list.

In some embodiments, if a reference point is not detected at all in an image frame in the list of recent image frames (e.g., if a corner of the document moves outside of the camera's field of view), an image is not captured and the list of recent image frames is cleared.

It is noted that the technique described herein with respect to FIGS. 2 and 3, which involves using the position of a given reference point in the current image frame as a center point for an acceptable range for corresponding reference points in previous image frames, is included as an example, and other implementations are possible.

For example, alternatively, the position of a given reference frame in a first image in a series may be used as the center point for an acceptable range of corresponding reference points in each subsequent image frame. Alternatively, a mean and standard deviation of a given reference point may be determined based on positions of the given reference point in all of the image frames in the series, and the reference point may be determined to be substantially deviated if the reference point is outside of a range defined by the mean and standard deviation in any of the image frames. Notably, techniques described herein involve determining whether a position of a reference point in a current image frame is similar to (e.g., within an acceptable position range with respect to) positions of the reference point in a number of previous images, and many different techniques may be utilized to make this determination. Thus, while illustration 300 depicts reference point 354 being within range 314, it may be said that reference point 354 is not within an acceptable position range with respect to corresponding reference points in image frames 302, 304, and 306.

Example Operations for Object-Based Image Detection

Figure 4:
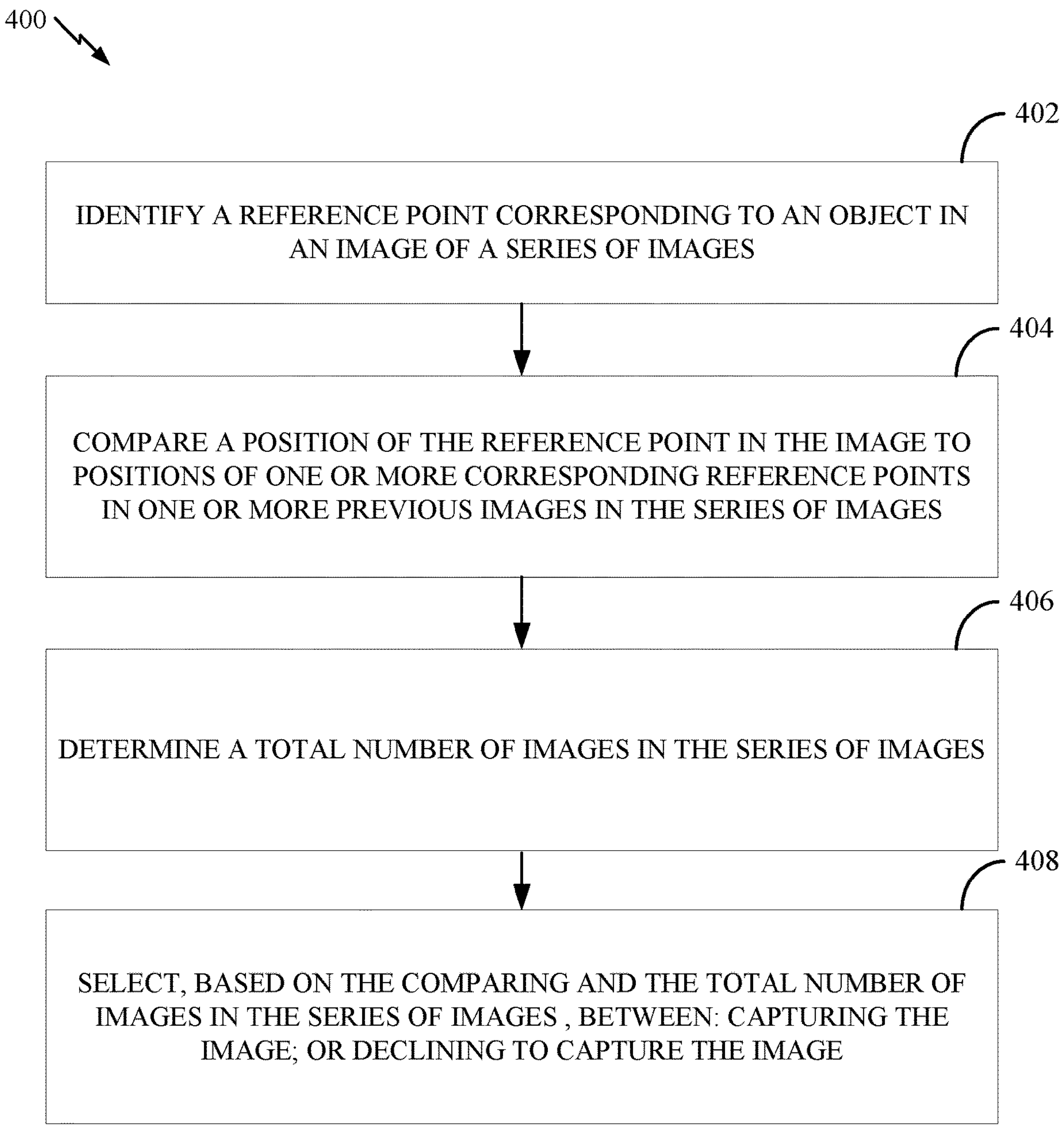
FIG. 4 depicts example operations related to object-based image capture.

FIG. 4 depicts example operations 400 for object-based image detection. For example, operations 400 may be performed by an application associated with device 102 of FIG. 1 or processing system 500 of FIG. 5.

Operations 400 begin at step 402 with identifying a reference point corresponding to an object in an image of a series of images.

Operations 400 continue at step 404, with comparing a position of the reference point in the image to positions of one or more corresponding reference points in one or more previous images in the series of images.

Operations 400 continue at step 406, with determining a total number of images in the series of images.

Operations 400 continue at step 408, with selecting, based on the comparing and the total number of images, between: capturing the image; or declining to capture the image. For example, the total number of images in the series of images may be compared to a threshold.

Some embodiments comprise determining, based on the comparing, that one of the one or more corresponding reference points in one of the one or more previous images in the series of images is more than a threshold distance from the reference point in the image, removing the one or more previous images from the series of images, and declining to capture the image. Certain embodiments further include generating a notification based on the determining that the one of the one or more corresponding reference points in the one of the one or more previous images in the series of images is more than the threshold distance from the reference point in the image.

In some embodiments, the selecting is further based on the data received from an accelerometer associated with a device. For example, upon determining an acceleration value beyond a threshold based on the data from the accelerometer, some embodiments include removing the one or more previous images from the series of images based on the acceleration value and declining to capture the image based on the acceleration value.

Some embodiments further comprise identifying one or more additional reference points corresponding to the object in the image. For example, the reference point and the one or more additional reference points may correspond to corners of the object and/or other features of the object. The selecting may further be based on positions of the one or more additional reference points in the image.

In one example, an acceptable position range with respect to the reference point may be determined based on a position of the reference point in the image and a threshold distance. As such, it may be determined that one or more corresponding reference points are within the acceptable position range in one or more previous images in the series of images.

Some embodiments include determining not to remove the one or more previous images from the series of images based on the determining that the one or more corresponding reference points are within the acceptable position range in the one or more previous images in the series of images. In some cases, if it is determined that a total number of images in the series of images exceeds a threshold, the last image may be captured based on the determining that the one or more corresponding reference points are within the acceptable position range in the one or more previous images in the series of images and the determining that the total number of images in the series of images exceeds the threshold.

Notably, operations 400 is just one example with a selection of example steps, but additional methods with more, fewer, and/or different steps are possible based on the disclosure herein.

Example Computing System

Figure 5:
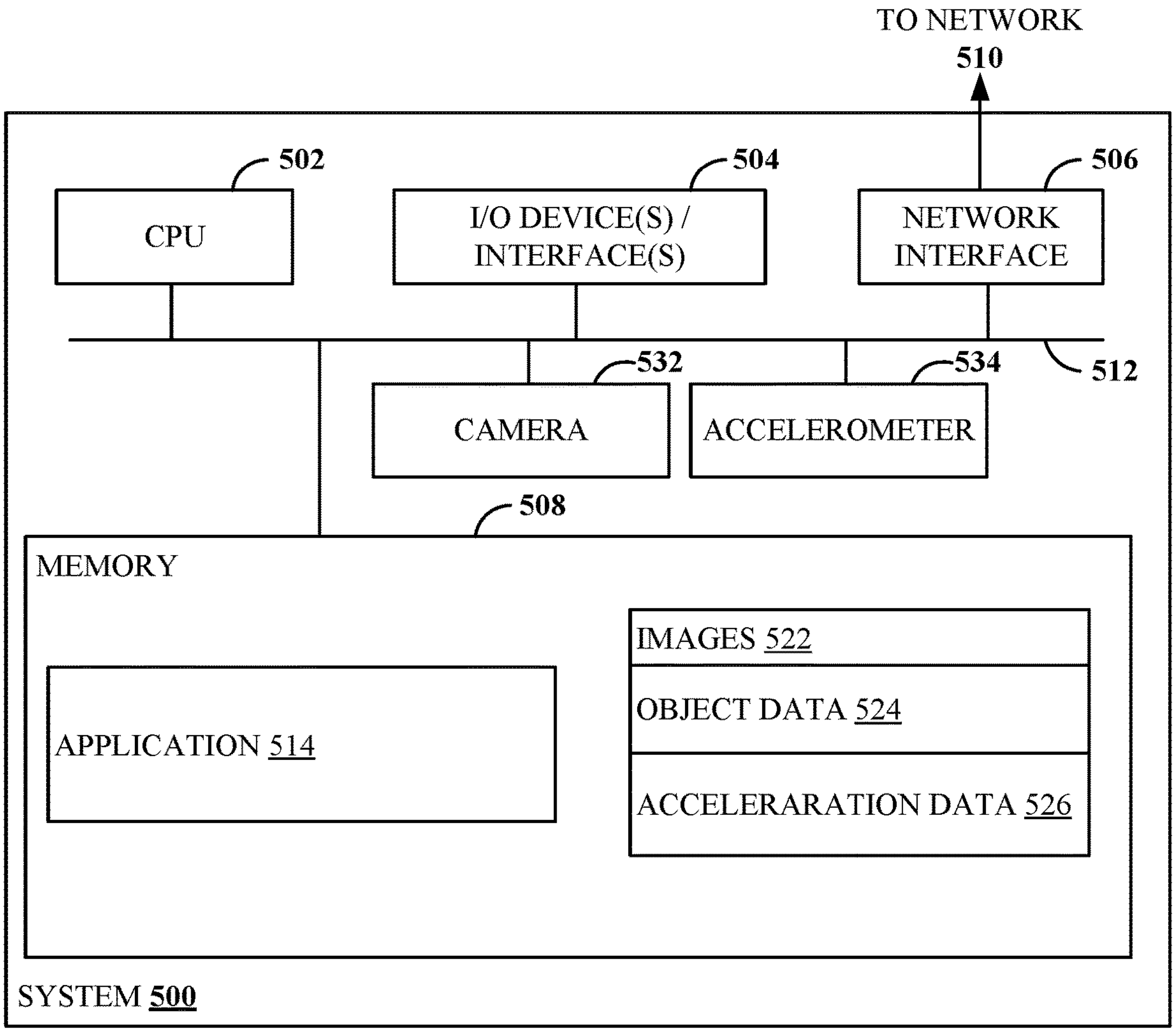
FIG. 5 depicts an example processing system for object-based image capture.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

System 500 further includes a camera 532, which used to capture images of objects as described herein, and accelerometer 534, which is used to detect the stability of system 500, as described herein.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, which may be representative of an application running on device 102 of FIG. 1 that provides image capture functionality as described herein.

Memory 508 further comprises images 522, which may be captured by camera 532, and may include image frames 202, 204, 206, and 208 of FIG. 2 and image frames 302, 304, 306, and 308 of FIG. 3. Memory 508 further comprises object data 524, which may include data related to objects detected in images, such as positions of reference points 252, 254, 256, and 258 of FIG. 2 and reference points 352, 354, 356, and 358 of FIG. 3. Memory 508 further comprises acceleration data 526, which may include data received from accelerometer 534.

Note that FIG. 5 is just one example of a processing system, and other processing systems including fewer, additional, or alternative elements are possible consistent with this disclosure.

Example Clauses

Clause 1: A method for object-based image capture, comprising: identifying a reference point corresponding to an object in an image of a series of images; comparing a position of the reference point in the image to positions of one or more corresponding reference points in one or more previous images in the series of images; determining a total number of images in the series of images; and selecting, based on the comparing and the total number of images in the series of images, between: capturing the image; or declining to capture the image Clause 2: The method of Clause 1, further comprising: determining, based on the comparing, that one of the one or more corresponding reference points in one of the one or more previous images in the series of images is more than a threshold distance from the reference point in the image; removing the one or more previous images from the series of images; and declining to capture the image.

Clause 3: The method of Clause 2, further comprising generating a notification based on the determining that the one of the one or more corresponding reference points in the one of the one or more previous images in the series of images is more than a threshold distance from the reference point in the image.

Clause 4: The method of any one of Clause 1-3, further comprising receiving data from an accelerometer associated with a device, wherein the selecting is further based on the data from the accelerometer.

Clause 5: The method of Clause 4, further comprising: determining an acceleration value beyond a threshold based on the data from the accelerometer; removing the one or more previous images from the series of images based on the acceleration value; and declining to capture the image based on the acceleration value.

Clause 6: The method of any one of Clause 1-5, further comprising identifying one or more additional reference points corresponding to the object in the image, wherein the reference point and the one or more additional reference points correspond to corners of the object.

Clause 7: The method of Clause 6, wherein the selecting is further based on positions of the one or more additional reference points in the image.

Clause 8: The method of any one of Clause 1-7, further the selecting is further based on a comparison of the total number of images in the series of images to a threshold.

Clause 9: A method for object-based image capture, comprising: receiving a series of images captured consecutively from a camera associated with a device; identifying a reference point corresponding to an object in a last image in the series of images; determining an acceptable position range with respect to the reference point based on a position of the reference point in the image and a threshold distance; determining that one or more corresponding reference points are within the acceptable position range in one or more previous images in the series of images; determining not to remove the one or more previous images from the series of images based on the determining that the one or more corresponding reference points are within the acceptable position range in the one or more previous images in the series of images; determining that a total number of images in the series of images exceeds a threshold; and capturing the last image based on the determining that the one or more corresponding reference points are within the acceptable position range in the one or more previous images in the series of images and the determining that the total number of images in the series of images exceeds the threshold.

Clause 10: The method of Clause 9, further comprising receiving data from an accelerometer associated with the device, wherein the capturing of the last image is further based on the data from the accelerometer.

Clause 11: The method of Clause 10, wherein the data from the accelerometer does not indicate an acceleration value beyond a threshold.

Clause 12: The method of any one of Clause 9-11, further comprising identifying one or more additional reference points corresponding to the object in the image, wherein the reference point and the one or more additional reference points correspond to corners of the object.

Clause 13: The method of Clause 12, wherein the capturing of the last image is further based on positions of the one or more additional reference points in the image.

Clause 14: A system, comprising one or more processors and a memory storing instructions that, when executed by the one or more processors, cause the system to perform a method for object-based image capture, the method comprising: identifying a reference point corresponding to an object in an image of a series of images; comparing a position of the reference point in the image to positions of one or more corresponding reference points in one or more previous images in the series of images; determining a total number of images in the series of images; and selecting, based on the comparing and the total number of images in the series of images, between: capturing the image; or declining to capture the image.

Clause 15: The system of Claim 14, wherein the method further comprises: determining, based on the comparing, that one of the one or more corresponding reference points in one of the one or more previous images in the series of images is more than a threshold distance from the reference point in the image; removing the one or more previous images from the series of images; and declining to capture the image.

Clause 16: The system of Clause 15, wherein the method further comprises generating a notification based on the determining that the one of the one or more corresponding reference points in the one of the one or more previous images in the series of images is more than a threshold distance from the reference point in the image.

Clause 17: The system of any one of Clause 14-16, wherein the method further comprises receiving data from an accelerometer associated with a device, wherein the selecting is further based on the data from the accelerometer.

Clause 18: The system of Clause 17, wherein the method further comprises: determining an acceleration value beyond a threshold based on the data from the accelerometer; removing the one or more previous images from the series of images based on the acceleration value; and declining to capture the image based on the acceleration value.

Clause 19: The system of any one of Clause 14-18, wherein the method further comprises identifying one or more additional reference points corresponding to the object in the image, wherein the reference point and the one or more additional reference points correspond to corners of the object.

Clause 20: The system of Clause 19, wherein the selecting is further based on positions of the one or more additional reference points in the image.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for object-based image capture, comprising:

configuring a processor associated with a camera to obtain a series of non-consecutive frames among image frames capturable by the camera, without saving all of the image frames capturable by the camera as captured image frames, for evaluation of reference points without requiring analysis of a relatively larger number of image frames in the image frames capturable by the camera;

wherein the series of non-consecutive frames is obtained according to a number of instances spaced according to a second time interval among the image frames capturable by the camera;

wherein a size of the second time interval is greater than a corresponding size of a first time interval between each two consecutive image frames of the image frames capturable by the camera at a default frame rate of the camera;

wherein the analysis includes:

receiving a series of images being the series of non-consecutive frames;

identifying, via the processor associated with the camera, a reference point corresponding to an object in an image of the series of images;

comparing, via the processor associated with the camera, a position of the reference point in the image to positions of one or more corresponding reference points corresponding to the object in one or more previous images in the series of images;

determining, via the processor associated with the camera, a total number of images in the series of images; and selecting, via the processor associated with the camera, based on the comparing and the total number of images in the series of images, between:

automatically capturing the image; or declining to capture the image.

2. The method of claim 1, further comprising:

determining, based on the comparing, that one of the one or more corresponding reference points in one of the one or more previous images in the series of images is more than a threshold distance from the reference point in the image;

removing the one or more previous images from the series of images; and declining to capture the image.

3. The method of claim 2, further comprising generating a notification based on the determining that the one of the one or more corresponding reference points in the one of the one or more previous images in the series of images is more than a threshold distance from the reference point in the image.

4. The method of claim 1, further comprising receiving data from an accelerometer associated with a device, wherein the selecting is further based on the data from the accelerometer.

5. The method of claim 4, further comprising:

determining an acceleration value beyond a threshold based on the data from the accelerometer;

removing the one or more previous images from the series of images based on the acceleration value; and declining to capture the image based on the acceleration value.

6. The method of claim 1, further comprising identifying one or more additional reference points corresponding to the object in the image, wherein the reference point and the one or more additional reference points correspond to corners of the object.

7. The method of claim 6, wherein the selecting is further based on positions of the one or more additional reference points in the image.

8. The method of claim 1, further the selecting is further based on a comparison of the total number of images in the series of images to a threshold.

9. A method for object-based image capture, comprising:

configuring a processor associated with a camera to obtain a series of non-consecutive frames among image frames capturable by the camera, without saving all of the image frames capturable by the camera as captured image frames, for evaluation of reference points without requiring analysis of a relatively larger number of image frames in the image frames capturable by the camera;

wherein the series of non-consecutive frames is obtained according to a number of instances spaced according to a second time interval among the image frames capturable by the camera;

wherein a size of the second time interval is greater than a corresponding size of a first time interval between each two consecutive image frames of the image frames capturable by the camera at a default frame rate of the camera;

wherein the analysis includes:

receiving a series of images being the series of non-consecutive frames;

identifying, via the processor associated with the camera, a reference point corresponding to an object in a last image in the series of images;

determining, via a processor associated with the camera, an acceptable position range with respect to the reference point based on a position of the reference point in the image and a threshold distance;

determining, via a processor associated with the camera, that one or more corresponding reference points corresponding to the object are within the acceptable position range in one or more previous images in the series of images;

determining, via a processor associated with the camera, not to remove the one or more previous images from the series of images based on the determining that the one or more corresponding reference points are within the acceptable position range in the one or more previous images in the series of images;

determining, via a processor associated with the camera, that a total number of images in the series of images exceeds a threshold; and automatically capturing, via a processor associated with the camera, the last image based on the determining that the one or more corresponding reference points are within the acceptable position range in the one or more previous images in the series of images and the determining that the total number of images in the series of images exceeds the threshold.

10. The method of claim 9, further comprising receiving data from an accelerometer associated with the camera, wherein the capturing of the last image is further based on the data from the accelerometer.

11. The method of claim 10, wherein the data from the accelerometer does not indicate an acceleration value beyond a threshold.

12. The method of claim 9, further comprising identifying one or more additional reference points corresponding to the object in the image, wherein the reference point and the one or more additional reference points correspond to corners of the object.

13. The method of claim 12, wherein the capturing of the last image is further based on positions of the one or more additional reference points in the image.

14. A system, comprising one or more processors and a memory storing instructions that, when executed by the one or more processors, cause the system to:

configuring a processor associated with a camera to obtain a series of non-consecutive frames among image frames capturable by the camera, without saving all of the image frames capturable by the camera as captured image frames, for evaluation of reference points without requiring analysis of a relatively larger number of image frames in the image frames capturable by the camera;

wherein the series of non-consecutive frames is obtained according to a number of instances spaced according to a second time interval among the image frames capturable by the camera;

wherein a size of the second time interval is greater than a corresponding size of a first time interval between each two consecutive image frames of the image frames capturable by the camera at a default frame rate of the camera;

wherein the analysis is to:

receive a series of images being the series of non-consecutive frames;

identify, via the processor associated with the camera, a reference point corresponding to an object in an image of the series of images;

compare, via the processor associated with the camera, a position of the reference point in the image to positions of one or more corresponding reference points corresponding to the object in one or more previous images in the series of images;

determine, via the processor associated with the camera, a total number of images in the series of images; and select, via the processor associated with the camera, based on the comparing and the total number of images in the series of images, between:

automatically capturing the image; or declining to capture the image.

15. The system of claim 14, wherein the instructions, when executed by the one or more processors, further cause the system to:

determine, based on the comparing, that one of the one or more corresponding reference points in one of the one or more previous images in the series of images is more than a threshold distance from the reference point in the image;

remove the one or more previous images from the series of images; and decline to capture the image.

16. The system of claim 15, wherein the instructions, when executed by the one or more processors, further cause the system to generate a notification based on the determining that the one of the one or more corresponding reference points in the one of the one or more previous images in the series of images is more than a threshold distance from the reference point in the image.

17. The system of claim 14, wherein the instructions, when executed by the one or more processors, further cause the system to receive data from an accelerometer associated with a device, wherein the selecting is further based on the data from the accelerometer.

18. The system of claim 17, wherein the instructions, when executed by the one or more processors, further cause the system to:

determine an acceleration value beyond a threshold based on the data from the accelerometer;

remove the one or more previous images from the series of images based on the acceleration value; and decline to capture the image based on the acceleration value.

19. The system of claim 14, wherein the instructions, when executed by the one or more processors, further cause the system to identify one or more additional reference points corresponding to the object in the image, wherein the reference point and the one or more additional reference points correspond to corners of the object.

20. The system of claim 19, wherein the selecting is further based on positions of the one or more additional reference points in the image.

* * * * *